United States Patent [19]

Field

[11] Patent Number: 4,738,588

[45] Date of Patent: Apr. 19, 1988

[54] FILM COOLING PASSAGES WITH STEP DIFFUSER

[76] Inventor: Robert E. Field, 208-16 Airport Rd., West Lafayette, Ind. 47906

[21] Appl. No.: 812,097

[22] Filed: Dec. 23, 1985

[51] Int. Cl.⁴ .............................................. F01D 5/18
[52] U.S. Cl. .................................. 416/97 R; 415/115
[58] Field of Search ........................ 416/97 R, 97 A; 415/115; 60/757

[56] References Cited

U.S. PATENT DOCUMENTS

| | | | |
|---|---|---|---|
| 1,857,509 | 5/1932 | Holmstrom | |
| 2,149,510 | 3/1939 | Darrieus | 60/41 |
| 2,220,420 | 11/1940 | Meyer | 60/41 |
| 2,236,426 | 3/1941 | Faber | 60/41 |
| 2,477,583 | 8/1949 | De Zubay et al. | 60/44 |
| 2,489,683 | 11/1949 | Stalker | 60/41 |
| 3,098,148 | 7/1963 | Piot et al. | 219/69 |
| 3,303,645 | 2/1967 | Ishibashi | 60/39.65 |
| 3,447,318 | 6/1969 | Caruel et al. | 60/39.65 |
| 3,515,499 | 6/1970 | Beer et al. | 416/95 |
| 3,527,543 | 9/1970 | Howald | 416/97 R |
| 3,542,486 | 11/1970 | Kercher | 415/115 X |
| 3,594,536 | 7/1971 | Holroyd | 219/69 |
| 3,606,573 | 9/1971 | Emmerson et al. | 416/97 A X |
| 3,619,076 | 11/1971 | Kydd | 416/90 |
| 3,635,586 | 1/1972 | Keat et al. | 416/97 |
| 3,746,827 | 7/1973 | Martin et al. | 219/69 |
| 3,778,183 | 12/1973 | Luscher et al. | 415/115 |
| 3,799,696 | 3/1974 | Redman | 416/97 |
| 3,801,218 | 4/1974 | Moore | 416/97 A |
| 3,830,450 | 8/1974 | Williams et al. | 244/42 |
| 3,844,677 | 10/1974 | Evans | 416/84 |
| 3,889,903 | 6/1975 | Hilby | 244/42 |
| 3,915,106 | 10/1975 | De Witt | 114/66.5 |
| 3,995,422 | 12/1976 | Stamm | 60/39.66 |
| 4,017,213 | 4/1977 | Przirembel | 416/97 A |
| 4,142,824 | 3/1979 | Andersen | 415/115 |
| 4,162,136 | 7/1979 | Parkes | 416/97 |
| 4,168,938 | 9/1979 | Dodd | 416/97 |
| 4,197,443 | 4/1980 | Sidenstick | 219/69 |
| 4,214,722 | 7/1980 | Tamura | 244/208 |
| 4,267,698 | 5/1981 | Hartmann et al. | 60/756 |
| 4,270,883 | 6/1981 | Corrigan | 416/97 A |
| 4,303,374 | 12/1981 | Braddy | 415/115 X |
| 4,314,442 | 2/1982 | Rice | 60/39.05 |
| 4,384,823 | 5/1983 | Graham | 416/1 |

FOREIGN PATENT DOCUMENTS

| | | |
|---|---|---|
| 599697 | 6/1960 | Canada ........................... 415/115 |
| 2840103 | 3/1979 | Fed. Rep. of Germany ...... 415/115 |
| 55-114806 | 9/1980 | Japan . |
| 665155 | 1/1952 | United Kingdom . |
| 2066372 | 7/1981 | United Kingdom ............. 416/97 A |

OTHER PUBLICATIONS

Flight and Aircraft Engineer, No. 2460, vol. 69, 3-1-6-56, pp. 292-295.

Advances in Heat Transfer by Richard J. Goldstein, vol. 7, Academic Press, (N.Y.) (9/1971), the Monograph Film Cooling, pp. 321-379.

NASA Technical Paper 1546, Influence of Coolant Tube Curvature of Film Cooling Effectiveness as Detected by Infrared Imagery by S. Stephen Papell et al., 9/1979.

*Primary Examiner*—Everette A. Powell, Jr.
*Attorney, Agent, or Firm*—Stephen E. Revis

[57] ABSTRACT

A film cooling passage through the wall of a hollow airfoil for a gas turbine engine has a metering section communicating with the interior of the airfoil for directing a metered amount of coolant through the passage in a first direction, followed by a mixing section to create turbulence in the flow as it leaves the metering section, followed by a diffusing section leading to the passage outlet at the outer surface of the airfoil. The mixing section comprises a sudden jog or step in the flow path of the fluid to suddenly disrupt its forward momentum in the first direction and to create turbulence therein whereby the fluid is more readily able to spread out within the following diffusing section and thereby stay attached to more widely diverging diffusion section walls. Wider diffusion angles in the coolant passage permits the same amount of coolant to be spread out over a wider area of the surface of the airfoil.

17 Claims, 5 Drawing Sheets

FILM COOLING PASSAGES WITH STEP DIFFUSER

DESCRIPTION

1. Technical Field

This invention relates to airfoils, and more particularly to film cooled airfoils.

2. Background Art

It is well known the external surface of airfoils may be cooled by conducting cooling air from an internal cavity to the external surface via a plurality of small passages. It is desired that the air exiting the passages remain entrained in the boundary layer on the surface of the airfoil for as long a distance as possible downstream of the passage to provide a protective film of cool air between the hot mainstream gas and the airfoil surface. The angle which the axis of the passage makes with the airfoil surface and its relation to the direction of hot gas flow over the airfoil surface at the passage breakout are important factors which influence film cooling effectiveness. Film cooling effectiveness is defined as the difference between the temperature of the main gas stream (Tg) and the temperature of the coolant film (Tf), divided by the temperature difference between the temperature of the main gas stream and the coolant temperature (Tc) at the passage exit (Tg−Tf)/(Tg−Tc). Film cooling effectiveness decreases rapidly with distance from the passage exit. Maintaining high film cooling effectiveness for as long a distance as possible over as large a surface area as possible is the main goal of airfoil film cooling.

It is well known in the art, that the engine airfoils must be cooled using a minimum amount of cooling air, since the cooling air is working fluid which has been extracted from the compressor and its loss from the gas flow path rapidly reduces engine efficiency. Airfoil designers are faced with the problem of cooling all the engine airfoils using a specified, maximum cooling fluid flow rate. The amount of fluid which flows through each individual cooling passage from an internal cavity into the gas path is controlled by the minimum cross-sectional area (metering area) of the cooling passage. The metering area is typically located where the passage intersects the internal cavity. The total of the metering areas for all the cooling passages and orifices leading from the airfoil controls the total flow rate of coolant from the airfoil, assuming internal and external pressures are fixed or at least beyond the designer's control. The designer has the job of specifying the passage size and the spacing between passages, as well as the shape and orientation of the passages, such that all areas of the airfoil are maintained below critical design temperature limits determined by the airfoil material capability, maximum stress, and life requirement considerations.

Ideally, it is desired to bathe 100% of the airfoil surface with a film of cooling air; however, the air leaving the passage exit generally forms a cooling film stripe no wider than or hardly wider than the dimension of the passage exit perpendicular to the gas flow. Limitations on the number, size, and spacing of cooling passages results in gaps in the protective film and/or areas of low film cooling effectiveness which may produce localized hot spots. Airfoil hot spots are one factor which limits the operating temperature of the engine.

U.S. Pat. No. 3,527,543 to Howald uses divergently tapered passages of circular cross section to increase the entrainment of coolant in the boundary layer from a given passage. The passages are also preferably oriented in a plane extending in the longitudinal direction or partially toward the gas flow direction to spread the coolant longitudinally upon its exit from the passage as it moves downstream. Despite these features, it has been determined by smoke flow visualization tests and engine hardware inspection that the longitudinal width of the coolant film from an eliptical passage breakout (i.e. Howald) continues to expand longitudinally only about a maximum of one passage exit minor diameter after the coolant is ejected on the airfoil surface. This fact, coupled with typical longitudinal spacing of three to six diameters between passages, result in areas of airfoil surface between and downstream of longitudinally spaced passages which receive no cooling fluid from that row of passages. Conical, angled passages as described in Howald U.S. Pat. No. 3,527,543 provide at best probably no more than 70% coverage (percentage of the distance between the centers of adjacent hole breakouts which is covered by coolant).

The velocity of the air leaving the cooling passage is dependent on the ratio of its pressure at the passage inlet to the pressure of the gas stream at the passage outlet. In general the higher the pressure ratio, the higher the exit velocity. Too high an exit velocity results in the cooling air penetrating into the gas stream and being carried away without providing effective film cooling. Too low a pressure ratio will result in gas stream ingestion into the cooling passage causing a complete loss of local airfoil cooling. Total loss of airfoil cooling usually has disastrous results, and because of this a margin of safety is usually maintained. This extra pressure for the safety margin drives the design toward the high pressure ratios. Tolerance of high pressure ratios is a desirable feature of film cooling designs. Diffusion of the cooling air flow by tapering the passage, as in the Howald patent discussed above is beneficial in providing this tolerance, but the narrow diffusion angles taught therein (12° maximum included angle) require long passages and, therefore, thick airfoil walls to obtain the reductions in exit velocities often deemed most desirable to reduce the sensitivity of the film cooling design to pressure ratio. The same limitation exists with respect to the trapezoidally shaped diffusion passages described in Sidenstick, U.S. Pat. No. 4,197,443. The maximum included diffusion angles taught therein in two mutually perpendicular planes are 7° and 14°, respectively, in order to assure that separation of the cooling fluid from the tapered walls does not occur and the cooling fluid entirely fills the passage as it exits into the hot gas stream. With such limits on the diffusing angles, only thicker airfoil walls and angling of the passages in the airfoil spanwise direction can produce wider passage outlets and smaller gaps between passages in the longitudinal direction. Wide diffusion angles would be preferred instead, but cannot be achieved using prior art teachings.

Figure 18:
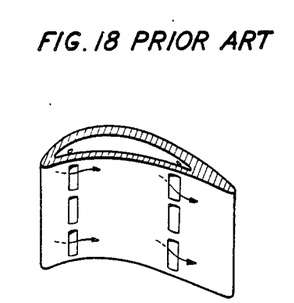
FIGS. 18 and 19 are reproductions of FIGS. 2 and 3, respectively, of prior art Japanese Patent No. 55-114806.
Figure 19:
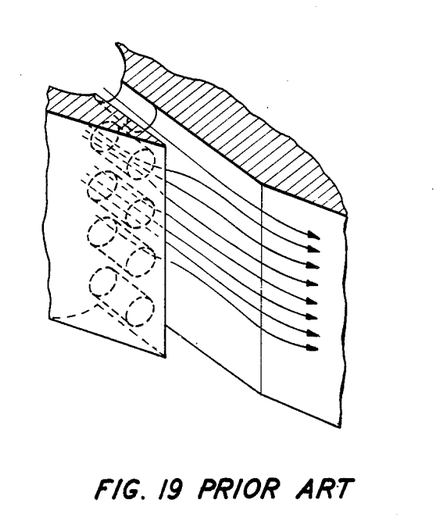

Japanese Patent No. 55-114806 shows, in its FIGS. 2 and 3 (reproduced herein as prior art FIGS. 18 and 19), a hollow airfoil having straight cylindrical passages disposed in a longitudinal row and emptying into a longitudinally extending slot formed in the external surface of the airfoil. While that patent appears to teach that the flow of cooling fluid from adjacent passages blends to form a film of cooling fluid of uniform thickness over the full length of the slot by the time the cooling fluid exits the slot and reaches the airfoil surface, our test experience indicates that the coolant fluid from the cylindrical passages moves downstream as a stripe of essentially constant width, which is substantially the diameter of the passage. Any diffusion which results in blending of adjacent stripes of coolant fluid occurs so far downstream that film cooling effectiveness at that point is well below what is required for most airfoil designs.

U.S. Pat. No. 3,515,499 to Beer et al describes an airfoil made from a stack of etched wafers. The finished airfoil includes several areas having a plurality of longitudinally spaced apart passages leading from an internal cavity to a common, longitudinally extending slot from which the cooling air is said to issue to form a film of cooling air over the airfoil external surface. In FIG. 1 thereof each passage appears to converge from its inlet to a minimum cross-sectional area where it intersects the slot. In the alternate embodiment of FIG. 9, the passage appears to have a small, constant size which exits into a considerably wider slot. Both configurations are likely to have the same drawbacks as discussed with respect to the Japanese patent; that is, the cooling fluid will not uniformly fill the slot before it enters the main gas stream, and considerably less than 100% film coverage downstream of the slot is likely.

Other publications relating to film cooling the external surface of an airfoil are: U.S. Pat. Nos. 2,149,510; 2,220,420; 2,489,683; and "Flight and Aircraft Engineer" No. 2460, Vol. 69, 3/16/56, pp. 292-295, all of which show the use of longitudinally extending slots for cooling either the leading edge or pressure and suction side airfoil surfaces. The slots shown therein extend completely through the airfoil wall to communicate directly with an internal cavity. Such slots are undesireable from a structural strength viewpoint; and they also require exceedingly large flow rates.

U.S. Pat. No. 4,303,374 shows a configuration for cooling the exposed, cut-back surface of the trailing edge of an airfoil. The configuration includes a plurality of longitudinally spaced apart, diverging passages within the trailing edge. Adjacent passages meet at their outlet ends to form a continuous film of cooling air over the cut-back surface.

A serial publication, "Advances in Heat Transfer" edited by T. F. Irvine, Jr. and J. P. Hartnett, Vol. 7, Academic Press (N.Y. 1971) includes a monograph titled *Film Cooling*, by Richard J. Goldstein, at pp. 321-379, which presents a survey of the art of film cooling. The survey shows elongated slots of different shapes extending entirely through the wall being cooled, and also passages of circular cross section extending through the wall.

DISCLOSURE OF INVENTION

One object of the present invention is an improved film cooling passage configuration for cooling a wall over which a hot gas stream is flowing.

Yet another object of the present invention is an airfoil film cooling passage which, in a short diffusing distance, is able to spread a small amount of coolant as a film over a large area of the external surface of the airfoil.

According to the present invention, a film cooling passage through a wall to be cooled has a metering section for directing a metered amount of coolant therethrough in a first direction, followed by a mixing section configured to create turbulence in the flow as it leaves the metering section and to at least partially disrupt its momentum in the first direction, followed by a diffusing section leading to the passage outlet at the outer surface of the wall over which a hot gas is to flow.

As discussed in the Background of the Invention, it has been a goal of the prior art to take a small amount of coolant fluid from the cool side of a wall to be cooled and to spread it out as a thin film over as large an area of the hot surface of the wall as possible. To do this, it is desirable to make the cooling passage outlet as long as possible in a direction perpendicular to the flow of hot gases over the surface at the passage outlet; and then the coolant fluid must uniformly (in the ideal case) fill the entire passage at the outlet so as to create a film of coolant downstream of the outlet which film is as wide as the outlet is long. The prior art teaches that diffusing the coolant flow from a small area inlet or metering section to a large area outlet necessitates the use of relatively small diffusion angles (i.e., less than 14°) to prevent separation from the diverging walls to assure that the coolant fluid fills the passage at the outlet. If one is limited to small diffusion angles, then long passage lengths are required to obtain large increases in passage outlet dimensions. When the wall to be cooled is thin, or has a concave curvature such as the wall of a hollow turbine airfoil, the length of the passage is severely limited.

In accordance with the present invention, it has been found, surprisingly, that a mixing section interconnecting the outlet of the metering section to the entrance of the diffusing section of the cooling passage permits the use of much larger diffusion angles in the diffusing section than has been possible using prior art configurations.

The mixing section may be of any configuration which creates turbulence in the coolant stream as it leaves the metering section, such as by rapidly expanding the flow to reduce and at least partially redirect the momentum of the stream such that the average velocity and cohesiveness of the coolant stream leaving the metering section outlet is diminished as it enters the diffusing section; and the mass flow of coolant no longer is uni-directional. This allows the coolant to more readily spread out within the diffusing section and to thereby stay attached to more widely diverging walls than was possible using prior art passage configurations. With the present invention a diffusing section having an included angle of 60° has been tested and becomes completely filled with coolant, which exits uniformly over the full extent of the outlet and forms a thin film of coolant on the hot surface. The use of angles of up to 80° are believed possible.

In a preferred embodiment of the present invention the mixing section is a step diffuser, wherein the coolant fluid exiting the metering section is suddenly expanded, such as by flowing over a step into a larger volume, as opposed to expanding by gradual diffusion. The sharp corner of the step is believed to create vortices which redirect part of the fluid momentum in a direction perpendicular to the original direction of flow from the metering section by the centrifugal forces created by the whirl of the vortex.

The foregoing and other objects, features and advantages of the present invention will become more apparent in the light of the following detailed description of preferred embodiments thereof as illustrated in the accompanying drawing.

BEST MODE FOR CARRYING OUT THE INVENTION

Figure 1:
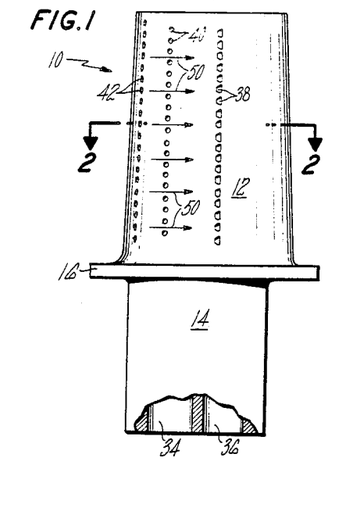
FIG. 1 is a hollow turbine blade, partly broken away, which incorporates the features of the present invention.
Figure 2:
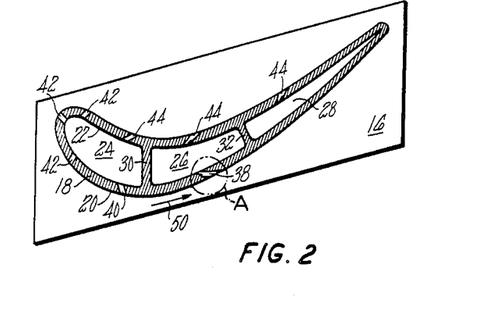
FIG. 2 is a sectional view taken along the line 2—2 of FIG. 1.

As an exemplary embodiment of the present invention consider the turbine blade of FIG. 1 generally represented by the reference numeral 10. With reference to FIGS. 1 and 2, the blade 10 comprises a hollow airfoil 12 which extends in a spanwise or longitudinal direction from a root 14 which is integral therewith. A platform 16 is disposed at the base of the airfoil 12. The airfoil 12 comprises a wall 18 having an outer surface 20 and an inner surface 22. The inner surface 22 defines a longitudinally extending internal cavity which is divided into a plurality of adjacent longitudinally extending compartments 24, 26, 28 by longitudinally extending ribs 30, 32. A passage 34 within the root 14 communicates with the compartment 24; and a passage 36 within the root 14 communicates with both compartments 26 and 28. When the blade 10 is operating in its intended environment, such as in the turbine section of a gas turbine engine, coolant from a suitable source, such as compressor bleed air, is fed into the passages 34, 36 and pressurizes the compartments 24, 26 and 28.

As shown in FIG. 1, the airfoil 12 includes a plurality of longitudinally extending rows of coolant passages, such as the passages 38, 40 on the suction side; the passages 42 in the vicinity of the leading edge of the airfoil; and the passages 44 on the pressure side. Each passage 38, 40, 42, 44 extends from an inlet at the inner surface 22 of the airfoil to an outlet at the outer surface 20. These passages need not be identical within a row or from row to row. The airfoil shown in FIGS. 1 and 2 has been simplified for purposes of clarity, and the number of rows of passages, the number of passages in each row, and the spacing between rows, as shown in the drawing, is intended to be illustrative only and not limiting.

Figure 9:
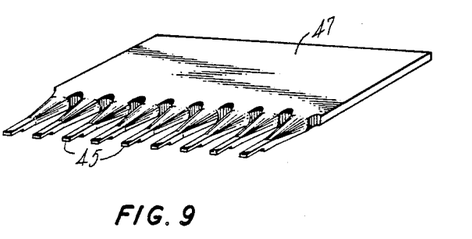
FIG. 9 is a perspective view of an electrode which can be used to simultaneously make a series of adjacent coolant passages similar to those described in FIGS. 3–6.

The coolant passages may be formed by any suitable means. A preferred method is by the well known technique of electro-discharge machining (EDM) using an electrode having the shape of the passage to be formed. A plurality of passages may be simultaneously formed using a "comb" electrode such as shown in FIG. 9, which is simply an electrode comprised of a plurality of adjacent "teeth" 45, each having the shape of the passage to be formed, and joined together at a common base 47. The method for forming the passages is not considered to be an aspect of the present invention.

Throughout the drawing the arrows 50 represent the direction of flow (i.e., steamlines) of hot gases over the surface of the airfoil. For purposes of the description of the present invention, the direction of flow of hot gases over either the pressure or suction side surfaces of the airfoil shall be considered the downstream direction. Thus, at any point on the suction or pressure side surface of the airfoil, the downstream direction is tangent to the surface of the airfoil and, except perhaps close to the airfoil tip or the airfoil base where atypical currents are generated, is substantially perpendicular to the spanwise direction of the airfoil.

The improved coolant passages of the present invention are herein shown as the passages 38 disposed in a spanwise row through the suction side wall of the airfoil, and shown greatly enlarged in FIGS. 3 through 6. Although described as suction side coolant passages, their use is not limited to the suction side of the airfoil. It will be evident that the present invention is useful for cooling any relatively thin wall which has a pressurized compartment or chamber containing relatively cool fluid on one side of the wall and a hot fluid flowing over the surface of the other side of the wall which, in the area to be cooled, is at a lower pressure than the coolant fluid.

Referring to FIGS. 3–6, the passage 38 includes, in series flow relation, a metering section 52, followed by a mixing section 54, followed by a diffusing section 56. In this embodiment, the metering section 52 is generally rectangular in cross-section; however, its specific cross-sectional shap is not critical to the present invention and may, for example, be circular or eliptical. By definition, the metering section 52 is that portion of the coolant passage 38 having the smallest cross-sectional area perpendicular to the direction of flow through the passage 38, which is along the passage centerline 39 which passes through the geometric center of the cross-sectional area of the metering section 52. The length B of the passage 38 is the length of the centerline 39 between the points where it intersects the surfaces 20, 22. In this specification, flow along the centerline 39 is in the "axial direction".

The metering section should have a constant cross-sectional area for no more than a distance equal to three times the effective diameter of the cross-sectional area of the metering section to reduce the cohesiveness of the mass of coolant exiting therefrom. The shorter the length the better, as long as the metering area is well defined. The inlet 58 to the metering section 52 communicates with the inlet 60 to the passage 38 at the inner surface 22 of the compartment 26 (FIG. 2) and receives a flow of coolant fluid therefrom. The outlet 62 of the metering section 52 is coincident with the inlet to the mixing section 54. In this exemplary embodiment, the mixing section comprises a step diffuser, as will be further described herein below.

The outlet 64 of the mixing section is coincident with the inlet of the diffusing section 56. The diffusing section 56 includes a pair of spaced apart flat surfaces 66, 68. The surface 68 is parallel to the spanwise or longitudinal direction of the airfoil. The surface 68 is also parallel to the centerline 39.

Figure 3:
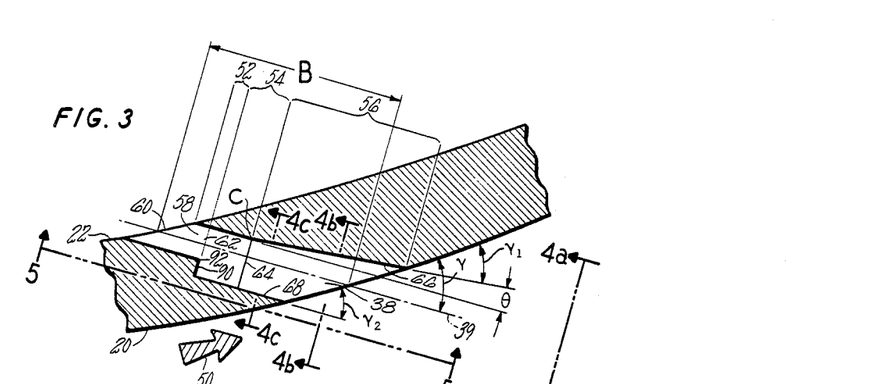
FIG. 3 is an enlarged view of the circled portion of FIG. 2 designated by the letter A showing a cooling passage configured according to the present invention.

The surfaces 66, 68 intersect the outer surface 20 of the airfoil at angles $\gamma_1$, $\gamma_2$, respectively (FIG. 3). These angles are preferably shallow angles of no more than about 40° (most preferably 30° or less), in order to minimize penetration of the coolant stream into the hot gas stream in a direction perpendicular to the outer surface of the airfoil. Excessive penetration can result in the coolant being immediately swept away from the surface of the airfoil rather than forming a film of coolant entrained in the boundary layer of the airfoil surface downstream of the passage outlet. The intersection of the surfaces 66, 68 with the outer surface 20 define downstream and upstream edges 73, 75, respectively, of the passage outlet 71; and for this reason the surfaces 66, 68 are referred to as the downstream surface and upstream surface, respectively. Note that the downstream surface 66 faces generally upstream, and upstream surface 68, faces generally downstream. It is preferred that the downstream surface 66 diverges from the centerline 39 toward the passage outlet 71. Preferably, the downstream surface diverges by an angle from the upstream surface 68 by an angle of between 5° and 10°. This reduces the angle $\gamma_1$, which is desirable. Although not preferred, the surfaces 66, 68 may be parallel to each other; and such a configuration is intended to fall within the scope of the present invention.

Figure 4A:
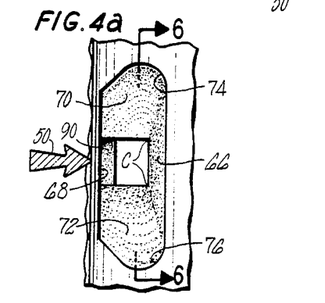
FIGS. 4(a), 4(b), and 4(c) are sectional views taken, respectively, along the lines 4(a)—4(a), 4(b)—4(b), and 4(c)—4(c) of FIG. 3.
Figure 4B:
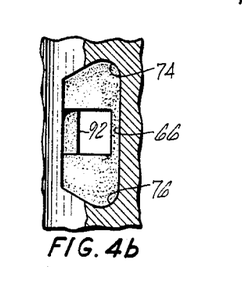
Figure 4C:
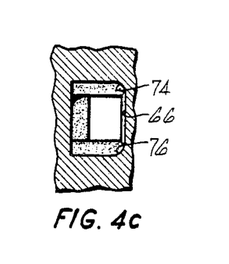
Figure 5:
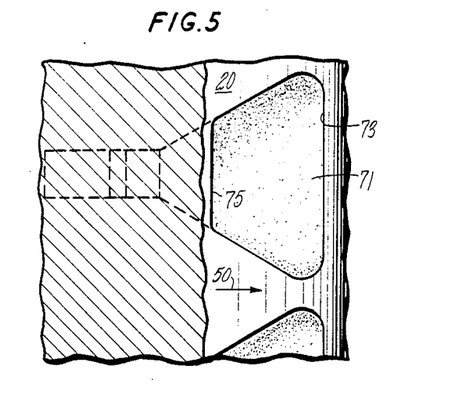
FIG. 5 is a sectional view taken along the line 5—5 of FIG. 3.
Figure 6:
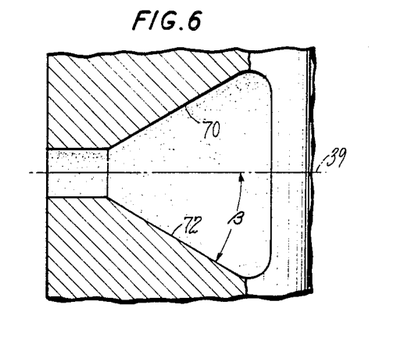
FIG. 6 is a sectional view taken along the line 6—6 of FIG. 4(a).

As best shown in FIGS. 4-6, the diffusing section 56 includes side surfaces 70, 72 which face each other and extend between the surfaces 66, 68. Each side surface also extends from the mixing section outlet to the passage outlet along a straight path which diverges from the axial direction 39 by an angle $\beta$ (FIG. 6). Divergence angles $\beta$ of up to 30° have been tested successfully, wherein a coolant film was produced having a width substantially equivalent to the full width of the passage outlet, meaning that the passage flowed "full". It is believed that with fine tuning divergence angles of up to 40° may be used.

Figure 14:
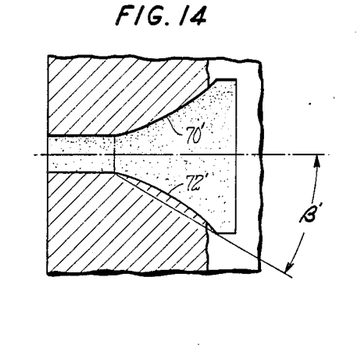
FIGS. 14 and 15 are schematic cross-sectional views, analogous to the view of FIG. 6, showing alternate configurations for coolant passages of the present invention.
Figure 15:
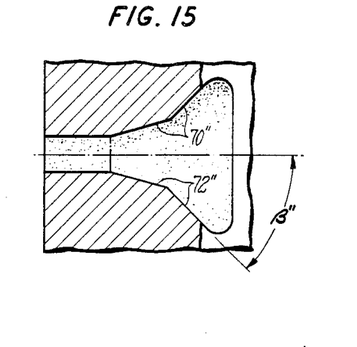

As shown schematically in FIGS. 14 and 15, respectively, the side surfaces may also be convexly curved (70', 72') or be comprised of a plurality of straight sections (70" or 72"), each diverging from the axial direction by a greater angle than the preceding section. The effective angle of divergence in each case is $\beta'$ and $\beta''$, respectively.

Referring to FIGS. 4a through 4c, each side surface 70, 72 blends (as at 74, 76) along its length with the downstream surface 66 as a smooth curve, as opposed to a sharp corner or filet radius (see FIGS. 10-12 discussed below). Preferably the diameter of the curved corner at the outlet of the passage 38 (FIG. 4a) is on the order of the distance between the surfaces 66, 68 at the outlet. The diameter is reduced gradually as the passage tapers down toward the diffusing section inlet. The corners preferably form segments of an oblique cone along the length of the diffusing section. The apex of the cones are preferably located at points C (FIGS. 3 and 4(a)). The smoothly curved corners create counterrotating vortices which further aid in uniformly filling the diffusing section with coolant, enabling the use of larger divergence angles $\beta$ than would otherwise be possible with the normal filet radii or sharp corners used by the prior art. This aspect of the present invention is further described and claimed in commonly owned, co-pending application U.S. Ser. No. 812,104, now a U.S. Pat. No. 4,684,323, titled "Improved Film Cooling Passages with Curved Corners" by the same inventor as the present application and filed on even date herewith. Such application is incorporated herein by reference.

The primary feature of the present invention is the mixing section 54 of the passage 38. The function of the mixing section 54 is to reduce and redirect the momentum of the coolant stream as it exits the metering section 52 before it reaches the diffusing section 56. In prior art passages such as shown in FIGS. 10-12 the coolant stream tends to remain a relatively cohesive, unidirectional mass which is difficult to redirect along the diverging surfaces 110, 112 of the diffusing section simply by viscous forces within the boundary layers. In accordance with the present invention, the redirection and reduction of the momentum of the coolant stream is brought about by increasing the cross-sectional area of the passage substantially step-wise, upstream of the diffusing section inlet, in a direction generally away from (i.e., opposite) the downstream direction 50 of the mainstream flow. In the embodiment of FIG. 3 this is toward and generally perpendicular to the plane of the upstream surface 68.

Figure 16:
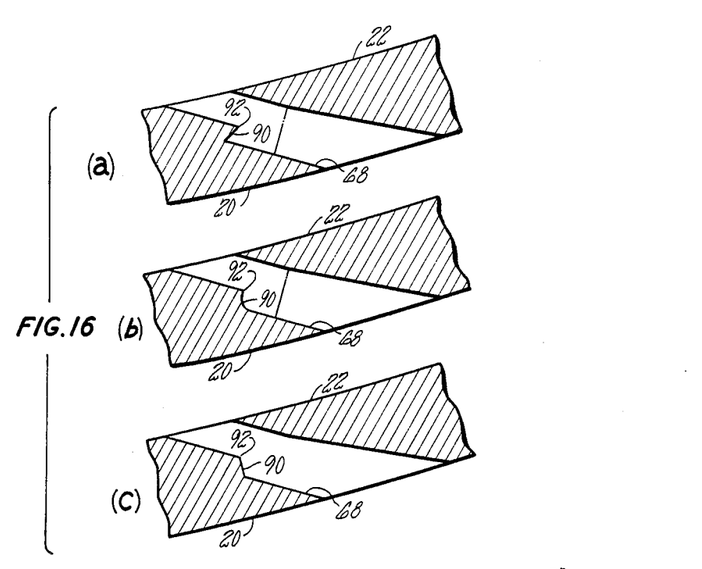
FIGS. 16 and 17 are schematic cross-sectional views, analogous to the view of FIG. 3, showing alternate configurations for the coolant passages of the present invention.

More specifically, in the embodiment of FIG. 3 the passage 38 has a step 90 at the metering section outlet 62. The step is perpendicular to the surface 68. The step 90 has a sharp corner or edge 92 which is believed to generate vortices along its length which gives a portion of the coolant fluid a component of velocity in a direction parallel to the edge 92. Alternate configurations for the step 90 are shown in FIG. 16. In FIG. 16(a) the step 90 is an undercut. In FIG. 16(b) the sharp inside corner or filet radius is replaced with a larger radius. In FIG. 16(c) the step 90 slopes toward the passage outlet, but at a sufficiently small angle that the flow from the metering section does not remain attached to the surface of the step downstream of the edge 92. Vortices are thus generated along the edge as in the embodiments of FIGS. 16(a) and (b). The slope of the step 90 must be selected such that the change in cross-sectional area at the metering section exit is rapid enough to generate the turbulence necessary to produce the desired results in the diffusing section 56 of the passage.

Figure 17:
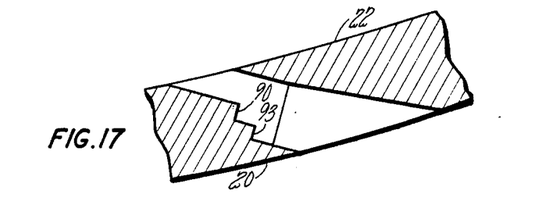

Preferably the passage cross-sectional area should increase suddenly at the metering section outlet to at least 1.5 times the metering section cross-sectional area. Also, the distance from the metering section outlet 62 to the upstream edge 75 of the passage outlet is preferably no greater than four times the equivalent diameter of the metering section cross-sectional area because the diffusing effects created by the vortices in the mixing section 54 decay rapidly, and the coolant flow tends to return to a cohesive state if the distance between the mixing section outlet 64 and the airfoil surface 20 becomes too large. Furthermore, the distance between the step and the inlet to the diffusing section also should not be so long as to allow the flow to re-coalesce with its momentum once again directed substantially only axially. Long mixing sections may, therefore, require a second step 93 or sudden further increase in cross-sectional area, as shown in FIG. 17.

Figure 7:
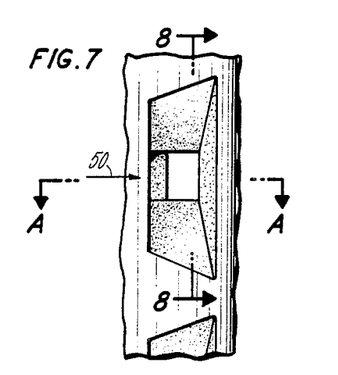
FIG. 7 is a cross-sectional view, analogous to FIG. 4(a), showing an alternate configuration for the coolant passage of the present invention.
Figure 8:
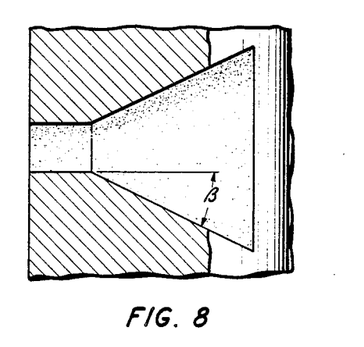
FIG. 8 is a sectional view taken along the line 8—8 of FIG. 7.

Although the mixing section feature of the cooling passage of exemplary embodiment of FIGS. 3–6 is combined with the feature of a large curvature joining the side surfaces with the downstream surface in the diffusing section, these features provide benefits independent of each other; and the present invention is not limited to the combination of the two. Thus, the use of the mixing section with a diffusing section having standard filet radii (i.e., sharp corners), as shown in FIGS. 7 and 8, also provides significant improvements over the prior art. FIGS. 7 and 8 are views corresponding, respectively, to FIG. 4(a) and FIG. 6, which show an alternate configuration for the diffusing section 56 of FIG. 3 wherein the corners are all "sharp". The graph of FIG. 13 shows tests results for such alternate configuration as well as for a "baseline" configuration described below.

Figure 13:
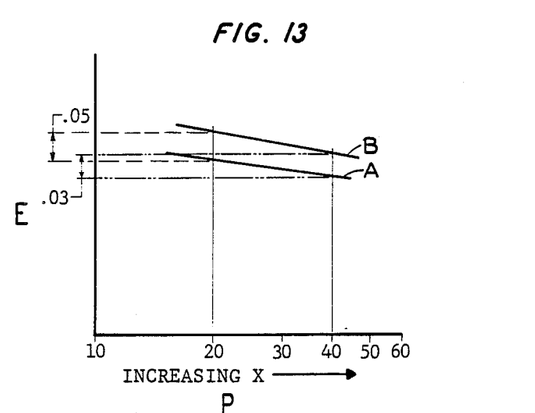
FIG. 13 is a graph which may be used to compare the film cooling effectiveness of a coolant passage configuration of the present invention to that of the base line configuration of FIGS. 10–12.

In FIG. 13 the horizontal axis is a dimensionless parameter P whose value is the ratio of the distance X from the outlet of the cooling passage (in the direction of the mainstream gas flow over the outlet) to a number directly related to the mass flow rate of cooling air exiting the passage. The vertical axis is a measure of the film cooling effectiveness E (as hereinabove defined) measured at a distance X downstream of the passage outlet. The maximum possible cooling effectiveness is 1.0. Because P is directly related to distance from the passage outlet, and since the distance downstream of the outlet is the only variable in these tests, P may be considered as a measure of distance downstream of the passage outlet.

Figure 10:
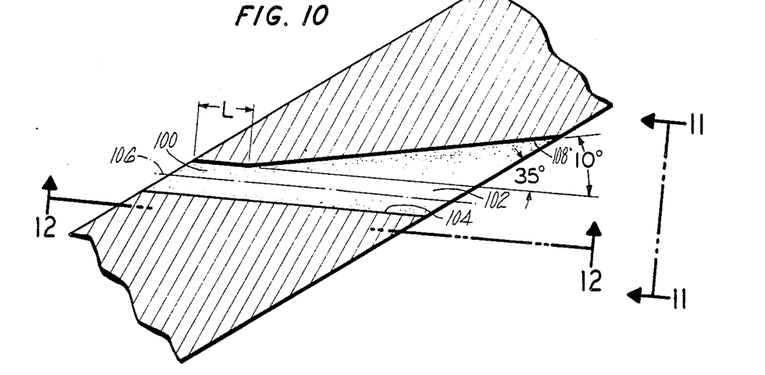
FIGS. 10–12 show the base line cooling passage configuration against which comparisons of the present invention may be made.
Figure 11:
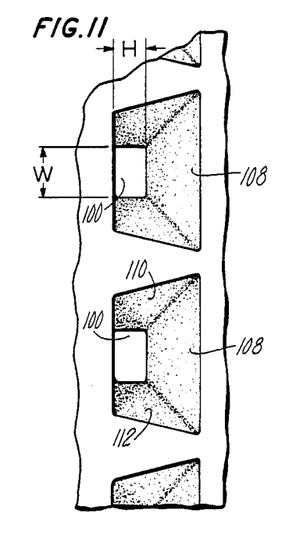
Figure 12:
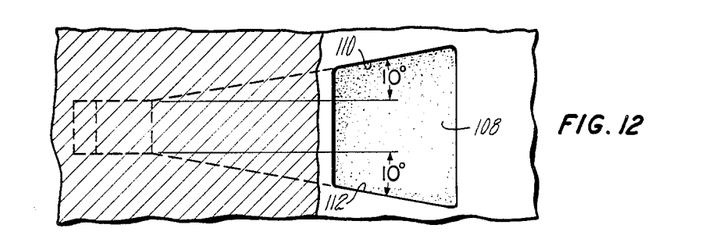

The curve labeled A is for the baseline coolant passage as shown in FIGS. 10–12. The baseline configuration is used for comparison purposes and is similar to the coolant passages described in Sidenstick, U.S. Pat. No. 4,197,443 except the divergence angles are 10°. The baseline test piece was a flat plate having a thickness of 1.4 inch. A baseline passage was machined into the plate. The flow of hot gas over the passage outlet was perpendicular to the downstream edge of the passage outlet. The constant cross-section metering section of the passage had a length L of 0.475 inch; a width W of 0.450 inch; and a height H of 0.300 inch. The diffusing section 102 of each passage had an upstream surface 104 parallel to the axial direction 106 of the passage. The corners of the diffusing section 102 were all "sharp". The diffusing section 102 also had a downstream surface 108 which diverged at an angle of 10° from the axial direction. The side surfaces 110, 112 each diverged from the axial direction at an angle of 10° which we determined avoids separation (i.e., such that the passage flows "full" and produces a coolant film of substantially the same width as the passage outlet) despite the teaching of Sidenstick which suggests maximum divergence angles of 7°. The angle between the axial direction and the outer surface 114 of the test piece was 35°.

The curve B represents data for a single coolant passage according to the present invention and shaped as shown in FIGS. 7 and 8, which passage, in cross-section taken along the line A—A, appears the same as in the view shown in FIG. 3. The thickness of the flat plate test piece was 0.9 inch. The angle $\gamma$ was 30° and $\theta$ was 10°. The angles $\beta$ were 30°. The metering section had a length of 0.5 inch, a width W of 0.41 inch, and a height H of 0.28 inch. The mixing section had a length of 0.5 inch in the axial direction, a width of 0.41 inch and height of 0.42 inch. The mass flow rate of coolant through the passages represented by curves A and B was the same and constant during the test. The passages flowed "full" as evidenced by smoke flow visualization tests.

The graph shows that at 20 units distance downstream of the passage outlet the film cooling effectiveness of the present invention is about 0.05 greater than that of the baseline configuration; and at 40 units distance the difference is about 0.03. To put this in perspective, assuming a coolant temperature at the passage outlet of 1200° F. and a mainstream gas temperature of 2600° F., a 0.02 increase in cooling effectiveness translates into about a 28° F. decrease in the temperature of the coolant film for the same mass flow rate of coolant.

In addition to better cooling effectiveness directly downstream of each passage outlet, the wider divergence angles of the passages of the present invention result in spreading the same amount of coolant over a significantly greater area than the baseline configuration using the same metering section cross-sectional area and a passage length on the order of about half the length required by the baseline configuration. This permits the use of coolant passages with small ratios of length (B) to metering section effective diameter (D), which is particularly advantageous when the wall to be cooled is very thin.

In small airfoils with thin walls (e.g., 0.03 inch thick), where the sum of the cross-sectional area of the metering sections of all the coolant passages is restricted, and the minimum size of each metering section is limited by practical considerations to about 0.015 inch diameter, the present invention permits the passage outlets of a spanwise row of passages to be more closely spaced from one another than if prior art passages were used. Thus, over the same spanwise length of the airfoil, even the best shaped passages of the prior art provide considerably less coverage than passages of the present invention, for the same total mass flow rate of coolant.

In the embodiment hereinabove described, and as clearly shown in FIG. 1, each passage 38 of a spanwise row of passages 38 breaks out at the surface 20 of the airfoil to form an outlet completely separate from each of the other outlets. The present invention contemplates that adjacent passages may be sufficiently close together and formed in such a manner that the passages (more specifically, the side walls) intersect each other below the surface 20, whereby a continuous outlet slot is formed at the surface 20 which runs the length of the row of passages. During operation this slot becomes filled with coolant; and the film of coolant formed on the surface 20 downstream of the slot is continuous in the longitudinal direction over the length of the row, eliminating gaps in film coverage resulting from the gaps between passage outlets. This is more fully described and claimed in commonly owned, copending patent application Ser. No. 812,103, now a U.S. Pat. No. 4,664,597, titled "Improved Film Cooling Slots for Airfoils" by Thomas A. Auxier, Edward C. Hill, and Leon R. Anderson filed on even date herewith.

Although the invention has been shown and described with respect to a preferred embodiment thereof, it should be understood by those skilled in the art that other various changes and omissions in the form and detail of the invention may be made without departing from the spirit and scope thereof.

I claim:

1. A cooled wall having an outer surface adapted to be exposed to a hot gas stream flowing in a downstream direction over said outer surface, an an inner surface adapted to define a portion of a coolant compartment for receiving coolant therein under pressure, a coolant passage within said wall, said passage including, in series flow relation, a metering section, a mixing section, and a diffusing section, said metering section having an inlet adapted to receive a flow of coolant from the coolant compartment and to control the rate of flow of coolant fluid through said passage, said metering section having an outlet which is the inlet to said mixing section, said mixing section having an outlet which is the inlet to said diffusing section, said diffusing section including a first surface facing generally downstream and spaced apart from and facing a second surface, said first and second surfaces being parallel to or diverging from each other toward said outer surface and intersecting said outer surface of said wall at a shallow angle to define an outlet of said coolant passage, wherein said metering section is oriented to direct the flow of coolant into said mixing section toward the outlet of said coolant passage in the direction of a first line which is the axial direction, said coolant passage being oriented to direct the flow of coolant from said passage outlet such that it has a component of velocity in the downstream direction, said diffusing section including side surfaces facing each other, interconnecting said first and second surfaces and diverging from each other toward said outer surface, wherein said passage increases in cross-sectional area substantially step-wise at said metering section outlet, said step-wise diffusion being only in a direction toward the plane of said first surface.

2. The cooled wall according to claim 1 wherein the cross-sectional area of said passage increases step-wise by a factor of at least 1.5 at said metering section outlet.

3. The cooled wall according to claim 1 wherein said first and second surfaces define, respectively, an upstream and downstream edge of said passage outlet, and wherein the distance from the outlet of said metering section to said upstream edge is no greater than four times the equivalent diameter of the cross-sectional area of said metering section outlet.

4. The cooled wall according to claim 1 wherein said mixing section includes a surface which is an extension of said first surface of said diffusing section, and said mixing section increases in area step-wise at said metering section outlet in a direction toward and perpendicular to the plane of said extended surface.

5. The cooled wall according to claim 1 wherein at least one of said side surfaces diverges from said axial direction by an angle of greater than 10°.

6. The cooled wall according to claim 5 wherein said first and second surfaces define, respectively, an upstream and downstream edge of said passage outlet, and said upstream and downstream edges of said passage outlet extend in a first direction substantially perpendicular to the downstream direction.

7. The cooled wall according to claim 6 wherein each of said side surfaces diverges from said axial direction at an angle of greater than 10°.

8. The cooled wall according to claim 5 wherein each of said side surfaces diverges from said first line at an angle of at least 15°.

9. The cooled wall according to claim 5 wherein said axial direction is substantially parallel to said first surface, and said second surface diverges from said axial direction at an angle of between 5° and 10°.

10. The cooled wall according to claim 7 wherein each of said side surfaces blends along its length with said second surface of said diffusing section as a smooth curve having a diameter at the outlet of said passage on the order of the distance between said first and second surfaces at said outlet.

11. The cooled wall according to claim 1 wherein said cooled wall is the external wall of a hollow airfoil.

12. The cooled wall according to claim 6 wherein said cooled wall is the external wall of a hollow airfoil, and said first direction is the spanwise direction of said airfoil.

13. The cooled airfoil wall according to claim 12 wherein the cross-sectional area of said passage increases step-wise by a factor of at least 1.5 at said metering section outlet.

14. The cooled airfoil wall according to claim 13 wherein said first and second surfaces define, respectively, an upstream and downstream edge of said passage outlet, and wherein the distance from the outlet of said metering section to said upstream edge is no greater than four times the equivalent diameter of the cross-sectional area of said metering section outlet.

15. The cooled airfoil wall according to claim 14 wherein said metering section extends in the axial direction from its inlet to its outlet, said metering section inlet being at the inner surface of said cooled wall.

16. The cooled airfoil wall according to claim 14 including a plurality of said passages having their outlets closely spaced apart and substantially aligned in the spanwise direction of said airfoil.

17. The cooled wall according to claim 4 wherein said first surface defines an upstream edge of said passage outlet.

* * * * *

UNITED STATES PATENT AND TRADEMARK OFFICE
CERTIFICATE OF CORRECTION

PATENT NO. : 4,738,588

DATED : April 19, 1988

INVENTOR(S) : Robert E. Field

It is certified that error appears in the above-identified patent and that said Letters Patent is hereby corrected as shown below:

Title page:

-- (73) Assignee: United Technologies Corporation
Hartford, Connecticut -- should be inserted.

Signed and Sealed this

Thirtieth Day of May, 1989

Attest:

DONALD J. QUIGG

Attesting Officer

Commissioner of Patents and Trademarks